United States Patent [19]

Hancock, Jr. et al.

[11] Patent Number: 5,671,762
[45] Date of Patent: Sep. 30, 1997

[54] DECONTAMINATION SYSTEM FOR PARTICULATE MATTER

[75] Inventors: Albert G. Hancock, Jr., Midland; Ignacio L. Cisneros, Odessa, both of Tex.

[73] Assignee: EnRem, Reno, Nev.

[21] Appl. No.: 507,137

[22] Filed: Jul. 25, 1995

[51] Int. Cl.⁶ ........................................................ B08B 3/04
[52] U.S. Cl. ........................... 134/65; 134/66; 134/104.3; 134/107; 134/108; 134/109
[58] Field of Search .................. 134/65, 66, 68, 134/104.2, 104.3, 104.4, 105, 107, 108, 109

[56] References Cited

U.S. PATENT DOCUMENTS

| | | | |
|---|---|---|---|
| 1,960,692 | 5/1934 | Brown et al. | 134/65 |
| 2,086,181 | 7/1937 | Bonotto | 134/66 X |
| 2,308,883 | 1/1943 | Kettenbach | 134/65 X |
| 4,168,714 | 9/1979 | Bahrke | 134/665 X |
| 4,611,612 | 9/1986 | Obie et al. | 134/65 |
| 4,783,253 | 11/1988 | Ayers et al. | |
| 5,128,068 | 7/1992 | Lahoda et al. | |
| 5,143,305 | 9/1992 | Dunham et al. | |
| 5,248,098 | 9/1993 | Schade. | |
| 5,268,128 | 12/1993 | Lahoda et al. | |
| 5,300,258 | 4/1994 | Grant et al. | |
| 5,308,553 | 5/1994 | Cisneros. | |
| 5,316,029 | 5/1994 | Campbell et al. | 134/109 X |
| 5,316,223 | 5/1994 | Lahoda et al. | |
| 5,341,826 | 8/1994 | Huber et al. | 134/65 |
| 5,344,255 | 9/1994 | Toor | 134/109 X |
| 5,421,527 | 6/1995 | Corte. | |
| 5,439,597 | 8/1995 | Allen | 134/65 X |

OTHER PUBLICATIONS

"HERE'S HOW IT WORKS . . . Texas Incinerator Co. Hydrocleaner™", Soils, Nov. 1994, p. 45.
"Texas Incinerator Company, Inc.", Advertisement Brochure, Nov. 1994, pp. 1–6.

*Primary Examiner*—Philip R. Coe
*Attorney, Agent, or Firm*—Novak Druce & Burt

[57] ABSTRACT

A decontamination system for particulate matter is provided. The system has a fluid treatment chamber within which three screw-type augers operate to mix hydrocarbon laden soil with treating fluid for removing the hydrocarbon therefrom. The treating fluid is maintained in a fluid reservoir and is circulated into and out of the treatment chamber. The fluid is heated by a direct and an indirect heater. The hydrocarbons are released from the soil and allowed to float to the top where they collect and are removed for recycle or disposal. The decontaminated soil is removed from the treating fluid by a drag slat conveyor that permits excess treating fluid to drain therefrom and be collected for reuse in the decontamination system. A cyclone separator is included to spin off suspended fines within the recovered treating fluid. Optionally, a fluid press may be employed to compress additional amounts of treating fluid from the decontaminated matter.

20 Claims, 7 Drawing Sheets

DECONTAMINATION SYSTEM FOR PARTICULATE MATTER

FIELD OF THE INVENTION

The present invention relates generally to apparatus and methods for decontaminating polluted particulate matter. More particularly, it relates to systems for decontaminating hydrocarbon polluted soils.

BACKGROUND OF THE INVENTION

As a result of any number of activities and accidents, soil and other matter may become polluted with hydrocarbons and other pollutants. In many, if not most cases, it is necessary that the contaminated materials be either cleaned or suitably disposed of to prevent environmental pollution. One common location of hydrocarbon pollution is at oil and gas well sites where spillage of crude may occur. Other situations that may require soil remediation are surface holding pits that have been previously used to contain hydrocarbons and hydrocarbon laden materials. Another common instance of soil being polluted by hydrocarbons occurs when underground holding tanks leak; an example is the underground tanks of a gasoline station. In each case, the contaminated soil must be removed for disposal or cleaned on site before being deposited back to the ground.

The quantity of soil requiring decontamination and the sites at which the soil is located may vary widely. Therefore, it has been recognized as being advantageous to have a decontamination system that is portable and of variable capacity. The site at which a clean-up is to take place may be remote. Therefore, the decontamination systems should be self-contained; that is, they should provide their own power and supplies. Because the hydrocarbons removed from the soil continue to be potential contaminants, they must be collected for adequate disposal. Furthermore, the hydrocarbons may be "heavy" as in the instance of crude oil, or they may be "light" as in the instance of gasoline. In the instance of heavy hydrocarbons, there is little vaporization. In the instance of the lighter hydrocarbons, however, vaporization is much more likely to cause air pollution; therefore, means for controlling volatile organic carbons (VOC) would be desirably included in decontaminating systems.

The presence of pollution negatively impacts the environment in most cases, and ultimately detriments those living things dependent upon the quality of the environment. For these reasons, statutes have been enacted and administrative regulations promulgated to assure that all parties are conscious of the consequences of pollution and to require compliance for the good of those potentially impacted. As a result, a demand for decontamination systems has been experienced and the need for portable, efficient, and self-contained systems has been recognized.

SUMMARY OF THE INVENTION

The present invention meets the recognized need for a decontamination system that is portable, efficient, and self-contained. A primary use for the decontamination system is the remediation of hydrocarbon polluted soils and other matter. It is anticipated, however, that the system may be used to "wash" other types of contaminants from solid materials. Among others, it is contemplated that heavy metals such as lead may be separated from otherwise innocuous materials. The cleaned materials may then be returned to the environment from which they came and the contaminants suitably disposed.

In the present invention, a solution of treating fluid is prepared that includes a combination of water and a surfactant that facilitates the release of the contaminant from the innocuous solid material when bathed therein. In the case of hydrocarbon removal, it is advantageous to employ detergents and/or other surfactants that dissolve in water or other aqueous solutions and that reduce the surface tension causing the hydrocarbon to adhere to the soil so that the hydrocarbon is more easily released and washed therefrom.

One particularly advantageous facilitator has been found to be an additive of modified sodium silicate having high pH, surfactant, and wetting agent characteristics. One example is sold under the trademark "MSS-58." The additive is non-toxic, non-corrosive, non-flammable and biodegradable. When a solution of water and "MSS-58" is applied to hydrocarbon laden soil, the hydrocarbon is caused to quickly release from the solid particles and be easily separated therefrom when agitated in the solution. The non-corrosive characteristic of the "MSS-58" treating solution makes it possible to construct a majority of the decontamination system out of carbon steel, instead of stainless. This permits manufacturing materials cost to be minimized. The details of "MSS-58", a modified sodium silicate, is fully described in U.S. Pat. No. 5,308,553 entitled Metal Hydride Compositions and Methods, which is expressly incorporated herein by reference.

It has also been found that the solution is more effective when heated. Therefore, two heaters have been included in the decontamination system. To assure efficiency, a direct contact heater has been included that is fed by the exhaust gas of an indirect, double walled heater. The direct contact heater exposes the treating fluid directly to the heated gas where a highly efficient transfer of heat occurs from the gas to the fluid. The direct heater is quick and efficient, but looses some effectiveness at fluid temperatures above one hundred and seventy degrees Fahrenheit (170° F.). The effectiveness is compromised above 170° because the treating solution begins to partially vaporize and energy and treating fluids are lost in the form of steam. For temperatures in excess of 170°, the indirect heater is used. Because the system is closed during exposure of the treating fluid to the indirect heater, the loss to steam does not occur. The transfer of heat, however, is less efficient at the indirect heater because some heat is lost to the environment in the exhaust gas that passes through the direct heater without having solution exposed directly therein.

The treatment chamber, for all practical purposes, is a closed vessel. As a result, any VOC's that vaporize during treatment may be collected therein and drawn off for further processing. It is contemplated that the VOC's may be filtered, scrubbed, burned or otherwise neutralized.

Complete mixing of the contaminated soil with the treating fluid is important. Furthermore, to assure the complete release of hydrocarbons from the solids, the soil particles are first wetted with the solution and then agitated within the treating solution while traveling through the treatment chamber. To assure proper mixing and disturbance, a series of three screw-type auger conveyances are employed; the intermediate of the three having cut and fold flights, as well and interference paddles.

The decontamination system has been designed to prevent those unfamiliar with its operation from over-loading the system. This is accomplished by sizing the receiving, or first conveyance so that its maximum capacity is equal to the optimal capacity of the particular system. Normally, a variable speed belt conveyor will be used to meter the contaminated soil into the decontamination system. In this manner, the feed rate may be varied if necessary and the treatment load may be optimized. The characteristics of the treated soil are analyzed to determine whether or not the feed rate needs to be adjusted or if the relative concentrations within the treating fluid require correction.

The third and final conveyance is sized so that under full system load the auger is only filled to about one-third of its capacity. This prevents the soil particles from being turbulently mixed with the treating fluid and becoming suspended therein. Instead, the soil remains in the auger for the most part and is slowly disturbed and mixed with the treating fluid. During this more gentle mixing, the hydrocarbons are allowed to release from the soil particles and float to the top of the treating fluid.

The released lighter hydrocarbons are collected from the surface of the treating fluid within the treatment chamber for recycling or disposal. The decontaminated soil is then removed from the treating fluid and vibrated upon a screen to remove excess fluid retained therein. The fluid is recycled back to the system for reuse. In the event that fines are suspended in the recovered treating fluid, the fluid may be optionally passed through a cyclone before reintroduction into the treating fluid reservoir to spin off silt and other similar fines.

In one embodiment of the present invention, a decontamination system for particulate matter is provided. The system has a fluid treatment chamber. The fluid treatment chamber includes an inlet port through which contaminated particulate matter is deposited into the fluid treatment chamber. Also included is a continuous receiving conveyance that receives deposited contaminated particulate matter and transports it at least partially through the fluid treatment chamber. There is a fluid applicator for wetting the contaminated particulate matter that is being carried by the receiving conveyance with a treating fluid that facilitates the separation of contamination from particulate matter. Included therewith is an agitating conveyance into which wetted contaminated particulate matter is deposited from the continuous receiving conveyance. The agitating conveyance is at least partially submersed in treating fluid so that a slurry is formed from the combination of contaminated particulate matter and treating fluid. A continuous final conveyance is located in a lower portion of the fluid treatment chamber. The final conveyance is completely submersed in the treating fluid. Lastly is an exit port through which decontaminated particulate matter passes for removal from the treating fluid.

The system further includes a fluid heater system having a direct fluid heater in which treating fluid is exposed directly to heated gas and an indirect fluid heater. The indirect fluid heater has an inner chamber containing heated gas and an outer chamber through which treating fluid is circulated and heated indirectly by the heated gas, Also included is a treating fluid reservoir and a heating conduit connected between the direct fluid heater and the indirect fluid heater that extends through an interior of the treating fluid reservoir so that heated gas passing through the heating conduit indirectly heats treating fluid contained within the reservoir.

A treating fluid circulation system is employed that has a circulation pump for circulating treating fluid between the treating fluid reservoir, the direct fluid heater, and the indirect fluid heater.

The treating fluid circulation system directs treating fluid to the direct fluid heater when the treating fluid's temperature is less than about 170 degrees fahrenheit and restricts the flow of fluid to the direct heater when the treating fluid's temperature exceeds about 170 degrees fahrenheit thereby preventing vaporization of the treating fluid.

In one embodiment, the treating fluid is a solution comprising water and a surfactant that promotes the release of hydrocarbon contaminants from soil.

In one embodiment, the surfactant is a modified sodium silicate.

A hydrocarbon recovery system is incorporated into the decontamination system having a weir located above a hydrocarbon/treating fluid interphase in the fluid treatment chamber so that lighter hydrocarbons floating above the treating fluid pass over the weir and into a hydrocarbon collection chamber.

A continuous conveyor is encompassed having an uptake end located proximate to a discharge end of the continuous final conveyance so that decontaminated particulate matter discharged from the discharge end of the final conveyance is deposited on the uptake end and removed from the treating fluid.

Downstream from the continuous conveyor is a vibrating inclined screen having an upper end located proximate to a discharge end of the continuous conveyor so that decontaminated particulate matter discharged from the discharge end of the continuous conveyor at the upper end is sufficiently shaken so that excess treating fluid is recovered therefrom for return to a treating fluid reservoir.

As an option, a filter press downstream of the vibrating screen may be included for compressing retained treating fluid from the decontaminated particulate matter.

Also included is a treating fluid recovery system having a collector positioned proximate to the vibrating inclined screen for collecting treating fluid released by the decontaminated particulate matter while on the screen. A recovery pump is coupled in fluid communication between the collector and the treating fluid reservoir returns collected treating fluid to the reservoir.

A cyclone separator may be coupled in fluid communication between the collector and the treating fluid reservoir for removing decontaminated particulate matter that is suspended in the recovered treating fluid before the fluid's return to the reservoir.

The fluid applicator further includes a plurality of spray nozzles located along a length of the receiving conveyance and a treating fluid supply conduit coupled in fluid communication between the treating fluid reservoir and the spray nozzles. There is a treating fluid supply pump coupled to the treating fluid supply conduit that is in fluid communication therewith for pumping treating fluid from the reservoir to the receiving conveyance for application to contaminated particulate matter.

As described, the receiving conveyance has a maximum capacity equal to a maximum processing capacity of the decontamination system thereby preventing the decontamination system from being overloaded.

The receiving conveyance and the agitating conveyance are auger type screw conveyors. The agitating conveyance further includes cut and folded flights and baffles for promoting mixing of the contaminated matter with the treating fluid.

For portability, a towable trailer chassis is provided upon which the other components of the decontamination system are coupled for transport therewith.

In another embodiment of the present invention, a method for washing hydrocarbon contaminated soil is disclosed. The method includes the step of depositing hydrocarbon contaminated soil into a continuous screw-type receiving conveyance of a decontamination system wherein the receiving conveyance is sized to have a maximum capacity equal to the maximum capacity of the decontamination system thereby preventing overfilling of the system. A treating fluid is applied to the soil that comprises a surfactant solution for promoting the release of the hydrocarbon from the soil. The contaminated soil is agitated with additional treating fluid by conveying the soil in a second continuous screw-type conveyance having cut and folded flights. The agitating conveyance is partially submersed in a fluid treatment chamber. The hydrocarbons are released from the soil and allowed to rise to a top of the fluid treatment chamber. The washed soil settles to the bottom of the fluid treatment chamber. The released hydrocarbons are collected from a surface of the treating fluid. The washed soil is then transported by a third continuous screw-type conveyance downstream from the agitating conveyance while being submerged in the treating fluid. Next, the washed soil is removed from the treating fluid on a continuous conveyor.

The treating fluid is prepared by mixing water and modified sodium silicate. Furthermore, the pH of the treating fluid is maintained within a range of 11.2 to 11.8 by adjusting the amount of modified sodium silicate added to the treating fluid solution. The pH range of 11.2 to 11.8 has been found to be particularly advantageous in the decontamination of hydrocarbon laden soils.

To facilitate decontamination, the treating fluid is heated up to about 170 degrees by exposing the treating fluid directly to heated gas. The treating fluid continues to be heated above about 170 degrees by exposing the treating fluid to an indirect heater within a treating fluid reservoir thereby preventing vaporization of the fluid.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Certain terminology will be used in the following description for convenience and reference only and will not be limiting. For example, the words "rightwardly", "leftwardly", "upwardly" and "downwardly" will refer to directions in the drawings to which reference is made. The words "inwardly" and "outwardly" refer to directions toward and away from, respectively, the geometric center of the structure being referred to. The words "upstream" and "downstream" will refer to locations within the decontamination process relative to the upstream end at which contaminated soil is introduced into the decontamination system and the downstream end at which the decontaminated soil is removed from the system. This terminology will include these words, specifically mentioned derivatives thereof, and words of similar import.

Furthermore, in the claims the elements have been recited as being "coupled"; the reason for such terminology's use is that it is anticipated that elements may be connected together in such a way that there are other components interstitially located between the connected elements or that the elements may be connected in fixed or movable relation one to the other.

Figure 1:
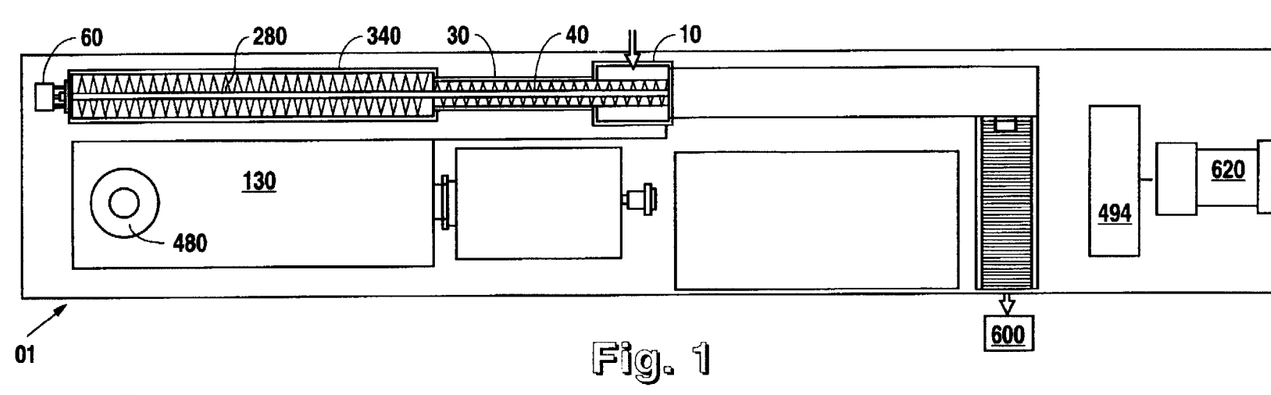
FIG. 1 is a top view of the decontamination system.
Figure 2:
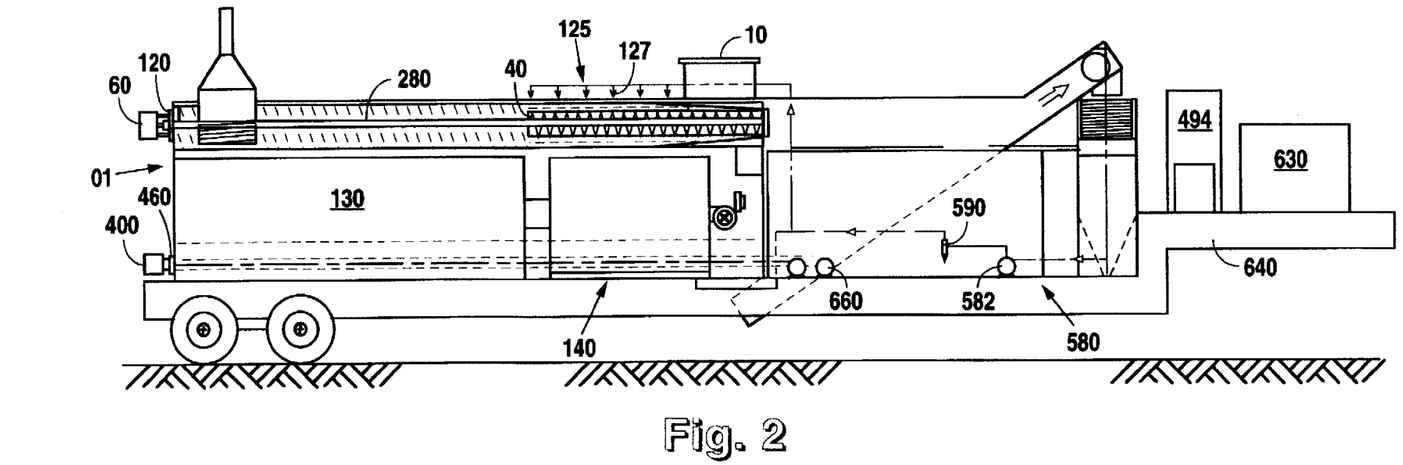
FIG. 2 is a side view of the decontamination system.

FIGS. 1 and 2 illustrate a system 01 for decontaminating particulate matter coated with pollutants such as hydrocarbons. In future references within this detailed description, the particulate matter to be treated in the decontamination system 01 will be described as soil laden with hydrocarbons. It should be understood, however, that any particulate matter may be cleaned and the treatable contaminants are not limited to hydrocarbons, as long as the contaminants lend themselves to removal by a wash process.

Typically, contaminated soil is delivered to the decontamination system 01 by a variable speed continuous delivery means such as a conveyor or other hopper type apparatus. If the soil is in relatively large pieces, it will be crushed and/or shredded into smaller pieces; preferably into pieces not greater than one inch in diameter. By breaking the matter into smaller pieces, its admission into the system 01 is facilitated and the surface area of the soil exposed to treating fluid 496 is increased to enhance hydrocarbon removal therefrom. As an example, the treating fluid 496 can be a mixture of water and surfactant that facilitates the release of the contaminant from the soil particles. The surfactant may be a modified sodium silicate concentrate that is mixed with water to form a one percent modified sodium silicate solution by volume. The concentration of the modified sodium silicate solution must be variable, however, depending upon soil types and contaminant load.

The solution is maintained at a pH of between 11.2 to 11.8 when decontaminating hydrocarbon laden soils. Because of differing soil conditions, however, the pH needs to be monitored manually or automatically by a continuous pH meter. If the solution falls below a pH 11.2, additional modified sodium silicate is added to boost the pH. The modified sodium silicate and water are stored respectively in a modified sodium silicate source and a water source until required.

Figure 5:
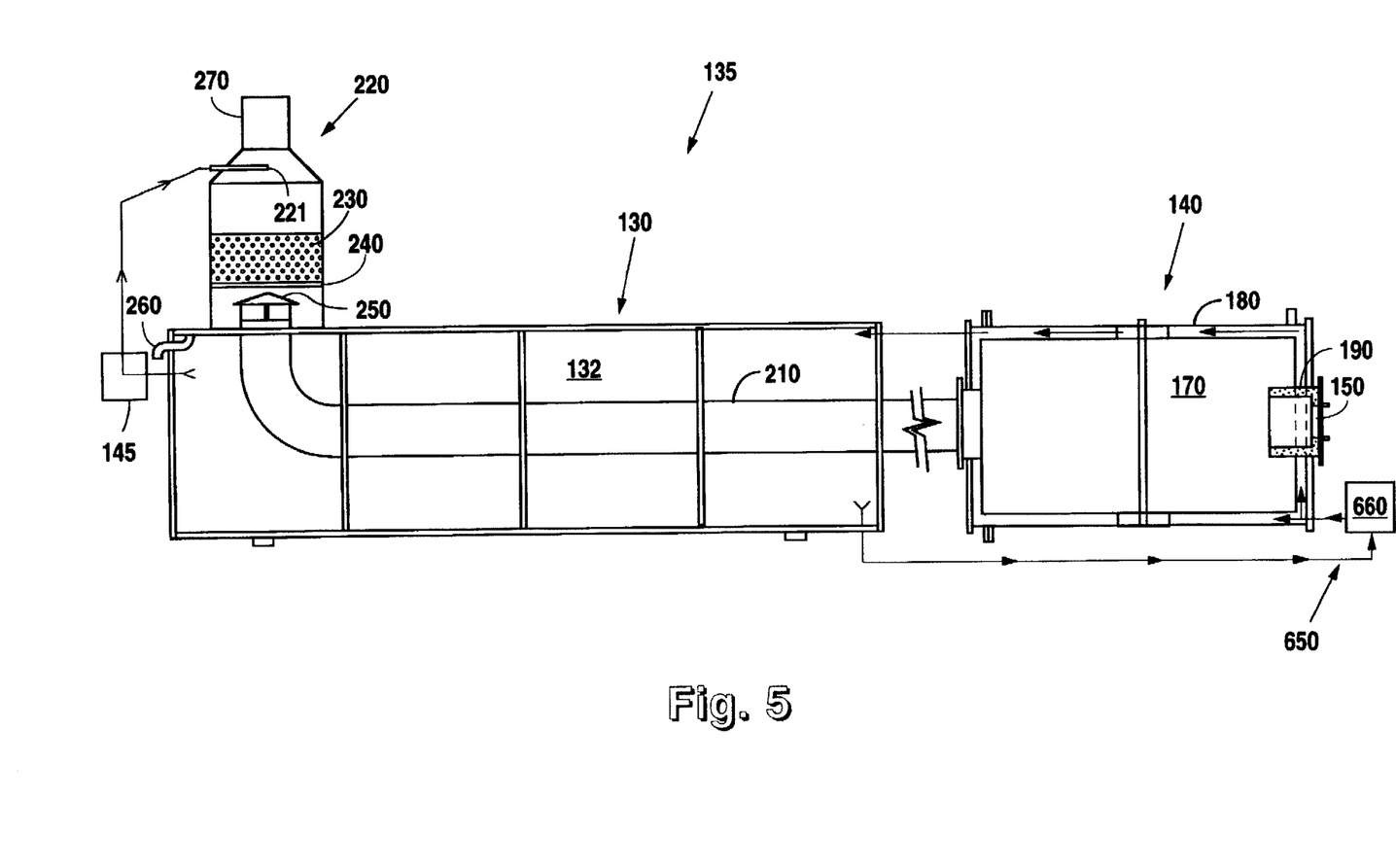
FIG. 5 is a side view of the fluid heater system shown in partial cutaway.

For treating hydrocarbon contaminated soil, the temperature of the treating fluid 496 is kept between 150 degrees Fahrenheit and 210 degrees Fahrenheit. Higher temperatures increase the treating fluid's 496 effectiveness. To heat and maintain the treating fluid's 496 temperature, a thermostatically controlled fluid heater system 135 such as that illustrated in FIG. 5, is employed.

Figure 3:
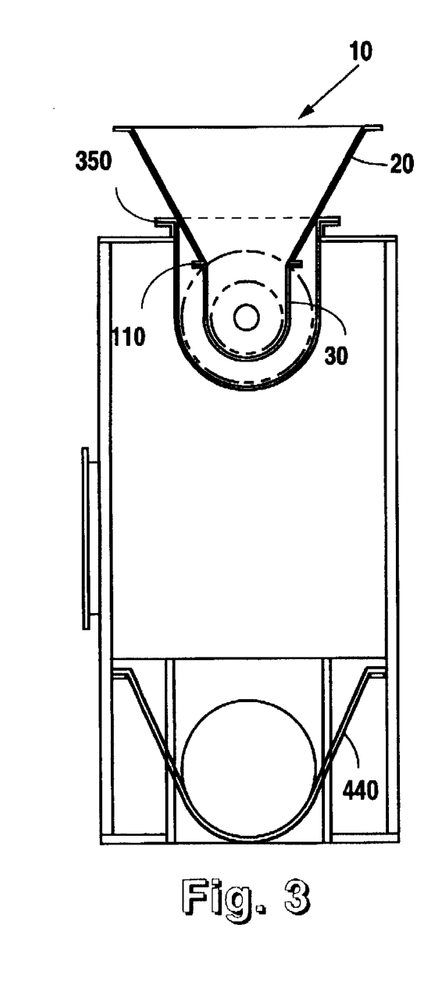
FIG. 3 is a cut-away view of the fluid treatment chamber showing the funnel shape of the inlet port or hopper.

The soil is initially introduced into the system 01 through an inlet port 10 that provides direct access into a continuous receiving conveyance 40. The receiving conveyance 40 is housed within a treatment chamber 21. The treatment chamber 21 houses several conveyances, each of which processes the contaminated soil for releasing the contaminants for recovery. Referring to FIG. 3, the inlet port 10 is shown to include inlet sidewalls 20 that funnel and direct the contaminated soil into the receiving conveyance 40 where it is contained within a receiving trough 30 that partially houses a screw auger of the conveyance 40. The trough 30 has flanges 110 upon which it is supported. The receiving conveyance 40 includes flights 50, a drive motor 60, support bearings 70, and a shaft 80 having a center axis 90. As is typical of a screw-type auger, the flights 50 resemble screw threads that when rotated transport matter contained therein; in this instance from the inlet port toward an agitating conveyance 280. Optionally, the flights 50 may be cut and folded to assist in the mixing of the soil with applied treating fluid 496. The bearings 70 may be constructed from nylon, Teflon, or other non-corrosive material that is durable and resistant to fouling. On one end of the shaft 80 is a seal plate 120 that prevents soil from escaping from the trough 30.

The receiving conveyance 40 has a length along which a fluid applicator 125 is positioned for applying treating fluid 496 to the soil. The fluid applicator 125 includes a plurality of spray nozzles 127. The spray nozzles 127 are supplied by a conduit fluidly connected to a reservoir 130 for the treating fluid 496. The treating fluid 496 is sprayed upon the soil wetting it as it passes along the receiving conveyance 40. The application of treating fluid 496 is controlled by a pump that activates when wetting fluid 496 is desired. The sprayed application of treating fluid 496 begins the washing process as a type of pre-treatment before the soil is completely emersed in the treating fluid 496.

Figure 4:
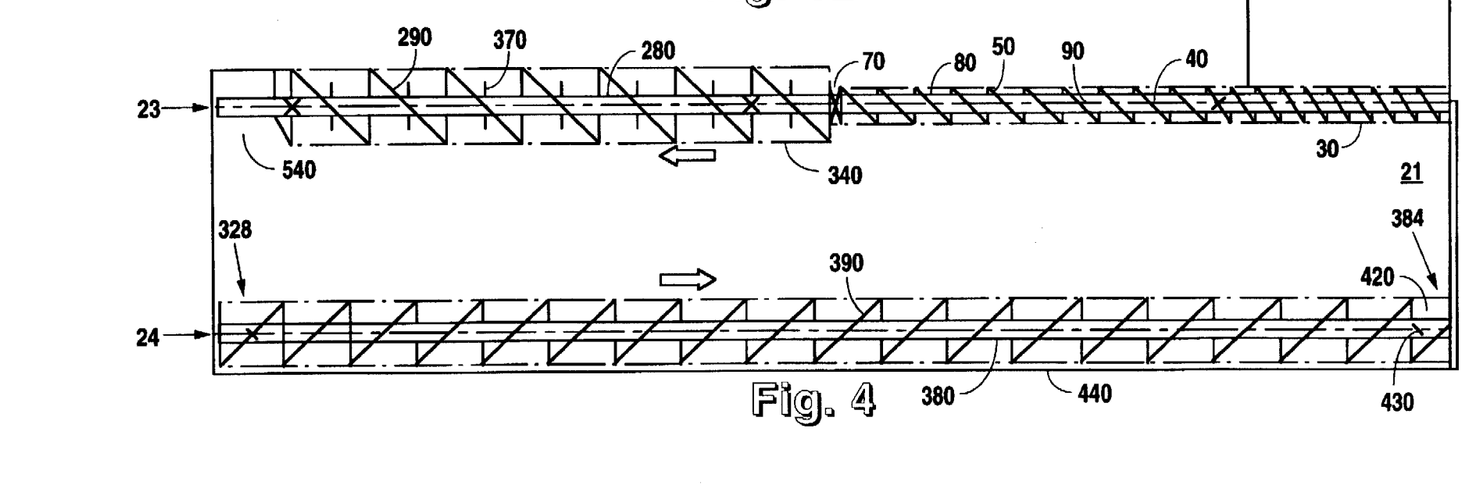
FIG. 4 is a cross-sectional view of the treatment chamber showing the three continuous conveyances.

Referring to FIG. 4, the treatment chamber 21 has a top portion 23 and a bottom portion 24. The troughs 30 and 340 of the receiving and agitating conveyances 40, 280 serve as a partition semi-separating the two portions 23,24 of the treatment chamber 21. The receiving conveyance 40 is not submerged in the treating fluid 496, but instead fluid 486 is sprayed onto the soil to wet it as described above. The agitating conveyance 280 is partially submerged in the treating fluid 496 so that the soil being agitated therein is soaked in treating fluid 496 and may become a slurry.

The agitating conveyance 280 has a larger diameter than the continuous receiving conveyance 40 and includes flights 290 and paddles 370. Agitating conveyance 280 shares the same drive motor 60, shaft 80, center axis 90, and seal plate 120 as receiving conveyance 40. The agitating conveyance 280 is positioned in the trough 340. The trough 340 has flanges 350 for forming a seal between the trough 340 and the sides of the treatment chamber 21. The flights 290 are cut and folded so that a kneading action is applied to the processing soil. Paddles 370 are welded between the flights 290. The paddles 370 provide an interference around which the soil must pass thereby enhancing the mixing of the soil and the treating fluid 496 in the agitating conveyance 280.

The bottom portion 24 of the treatment chamber 21 is completely filled with treating fluid 496. The bottom portion 24 houses a continuous final conveyance 380. Preferably, conveyances 40, 280, and 380 are screw-type augers. Each auger 40, 280, and 380 is partially contained within troughs 30, 340, and 440, respectively. Each trough 30, 340, and 440 fits about a lower portion of each auger's 40, 280, and 380 screw flights for retaining soil within the conveyance. The top of the troughs 30, 340, and 440 are open.

An opening 540 is provided in a downstream end of the agitating conveyance's 280 trough 340. The opening 540 serves as a passageway between the top and bottom portions 23,24. Soil drops from the agitating conveyance 280 to the final conveyance 380 that is housed in the bottom portion 24. The trough 440 acts as a funnel to keep the solids in the bottom of the conveyance 380. The continuous final conveyance 380 gently moves and stirs the soil as it progresses along the bottom of the treatment chamber 21. Only about one-third of the volumetric capacity of the final conveyance 380 is filled with soil, thereby allowing the hydrocarbons to escape from the soil during their loose and casual mixing with the treating fluid 496. It is a goal at this stage of the process to prevent the solids from becoming suspended in the treating fluid 496.

The solution heating system 135 includes a direct heater 220 for rapidly increasing the temperature of the treating fluid 496, especially during start-ups. Also included is an indirect heater 140. The direct heater 220 provides nearly one hundred percent heating efficiency up to 170 degrees Fahrenheit. The direct heater 220, however, loses efficiency at temperatures above 170 degrees Fahrenheit because the water turns to steam. Upon reaching 170 degrees Fahrenheit, direct heater pump 145 that supplies treating fluid 496 to the direct heater 220, shuts down. If the treating fluid temperature drops to 150 degrees Fahrenheit or below, the direct heater starts automatically.

The direct heater 220 includes a spiral jet nozzle 221, packed section 230, support 240 for the packed section 230, liquid deflector 250, overflow drain 260, and stack 270. Gas that has been heated by the burner 150 in the indirect heater 140 travels through the heating conduit 210. The heating conduit 210 carries heated gas through the treating fluid reservoir 130 and to the direct heater 220. The heating conduit 210, by being positioned in the interior 132 of the treating fluid reservoir 130, transfers additional heat into the treating fluid reservoir 130.

As the heated gas enters the direct heater 220, the treating fluid 496 is sprayed from the spiral jet nozzle 221 to form a mist that contacts the packed section 230. As the gas rises, the gas and treating fluid 496 intermix in the packed section 230. The packed section 230 increases the heat transfer between the treating fluid 496 and the heated gas. The heated treating fluid 496 then falls downward into the treating fluid reservoir 130, while the gases exit the stack 270. A liquid deflector 250 is positioned on the end of the heating conduit 210 to prevent the treating fluid 496 from entering the heating conduit 210.

Regarding the indirect heater 140, the burner 150 heats air entering the indirect heater 140. A refractory lining 190 prevents the burner 150 from damaging the heater 140. An exemplary burner 150 has a power rating of 1,500,000 British Thermal Units per hour (BTU/hr). The burner 150 may be of the type fueled by natural gas, LPG, or #2 fuel oil, depending on the operator's preference. The indirect heater 140 has an inner chamber 170 and an outer chamber 180. Air heated by the burner 150 is retained within the inner chamber 170 for a period of time.

The treating fluid circulation system 650 includes the outer chamber 180 and a circulation pump 660. The treating fluid 496 is circulated through the outer chamber 180 by the circulation pump 660. The heat from the inner chamber 170 transfers to the treating fluid 496 traveling through the outer chamber 180. The heated treating fluid 496 is pumped to the treating fluid reservoir 130. The indirect heater 140 can be used to heat the treating fluid 496 up to and exceeding 210 degrees Fahrenheit. The treating fluid 496 is also pumped to the direct heater 220 by the circulation pump 660. The fluid is only applied to the direct heater 220 when the fluid temperature is below 170 degrees Fahrenheit.

When treating different contaminants, vapors maybe created in the process. The treatment chamber 21 is sealed to prevent these vapors from exiting the system 01. In the case of hydrocarbon polluted soil, these vapors are principally the aromatic hydrocarbons or volatile organic compounds (VOC). As examples, treatment of the vapors may be accomplished by the use of an activated charcoal scrubber or direct flame thermal oxidizer. The scrubber or oxidizer is attached to the treatment chamber 21 either directly or indirectly.

Figure 6:
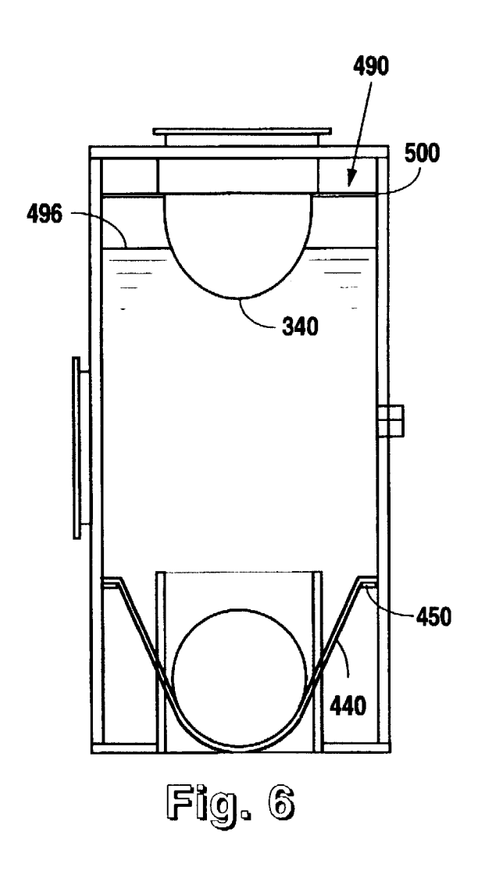
FIG. 6 is an end cut-away view of the treatment chamber substantially filled with treating fluid and exhibiting the weir system for recovering the hydrocarbon contaminants.

Due to the total and complete wetting of the soil particles, the hydrocarbons are separated from the soil and coalesce. As the hydrocarbon particles coalesce, they float to the top of the solution forming a hydrocarbon/treating fluid interphase 492. The hydrocarbon is gathered and removed by allowing it to flow over a top lip 500 of weir 490 into a hydrocarbon collection chamber 494 for reclamation or disposal.

As described, after the soil has been processed in the top portion of the treatment chamber 21, it drops through opening 540 of the agitating conveyance 280 upon an uptake end 382 of the continuous final conveyance 380. The final conveyance 380 includes flights 390, drive motor 400, a shaft 420, a center axis 430, the trough 440, and a seal plate 460. The trough 440 includes flanges 450 upon which it is supported. The flanges may also be utilized as a seal means with a body of the treatment chamber 21.

Figure 7:
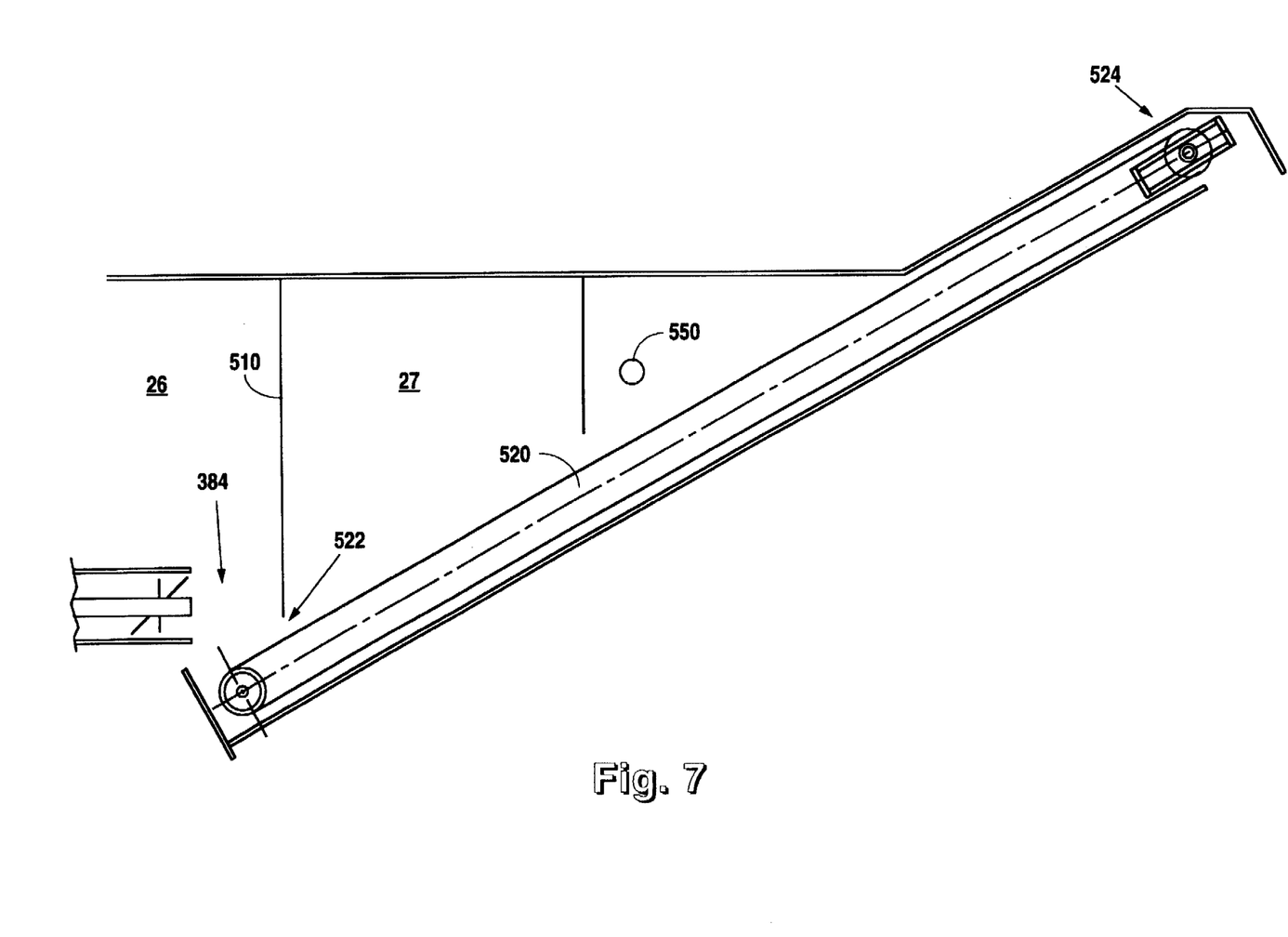
FIG. 7 is a side view of the upstream and downstream portion of the treatment chamber showing the conveyor through partial cut-always.
Figure 12:
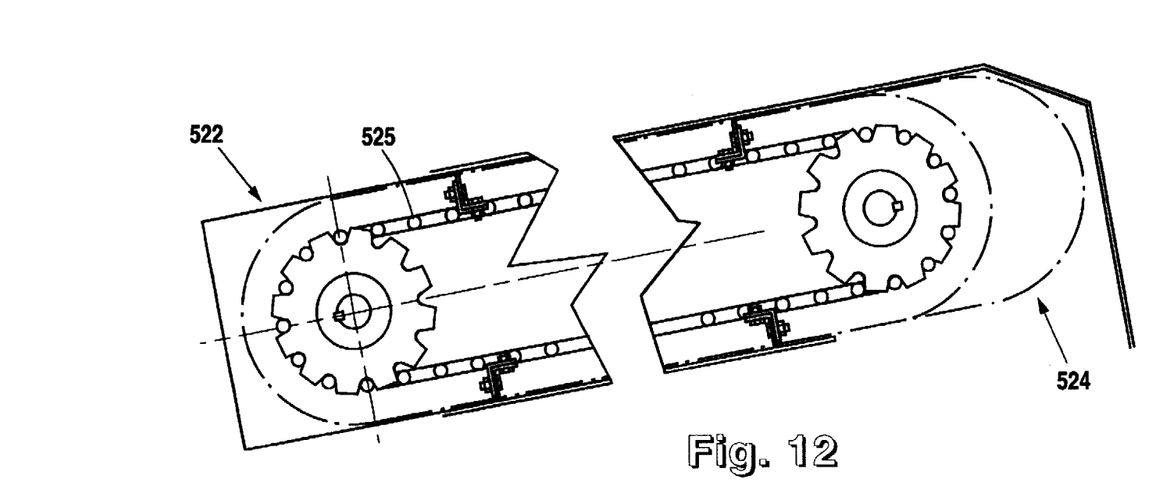
FIG. 12 is a side cut-away view of the drag slat continuous conveyor.

The discharge end 384 of the continuous final conveyance 380 terminates proximate to an exit port 545 through which soil is deposited on the uptake end 522 of continuous conveyor 520. The continuous conveyor 520 is of a drag slat variety. That is, the continuous belt of the live bed, or inclined ramp of the conveyor 520 comprises a series of spaced transverse bars or slats. The slats are close enough together that the soil solids are supported thereupon without passing between adjacent slats. Fluid, however, is allowed to drain from the soil and through the belt.

A downstream portion 27 of the treatment chamber 21 partially houses the continuous conveyor 520, while an upstream portion 26 houses conveyances 40, 280, and 380. A wall or end wall 510 partially separates the downstream portion 27 from the upstream portion 26. The treating fluid 496, along with soil, travels below the end wall 510 to reach the uptake end 522 of the continuous conveyor 520 through the exit port 545. The end wall 510 prevents the hydrocarbons from traveling to the downstream portion 27 because they are floating at the top of the upstream portion 26 where the wall 510 is solid.

A discharge pipe 550 allows the removal of treating fluid 496 at a rate substantially equal to the rate at which it is being supplied to the treatment chamber 21. The treating fluid 496 exiting through pipe 550 is routed to collector 585 and enters the treating fluid recovery system 580 which is hereinafter described.

If desired, the discharge pipe 550 can be manipulated to control the level of solution in the treatment chamber 21, including the upstream portion 26 where the collecting weir 490 is located. To raise the level of the treating fluid 496 in the upstream portion 26, the entrance into pipe 550 is raised. This raises the level of treating fluid 496 in both portions, causing all of the hydrocarbons to spill over the weir 490, and possibly a portion of the treating fluid 496. In this way, the treating chamber 21 can be purged of hydrocarbons and then drained when the decontamination process is completed.

Figure 8:
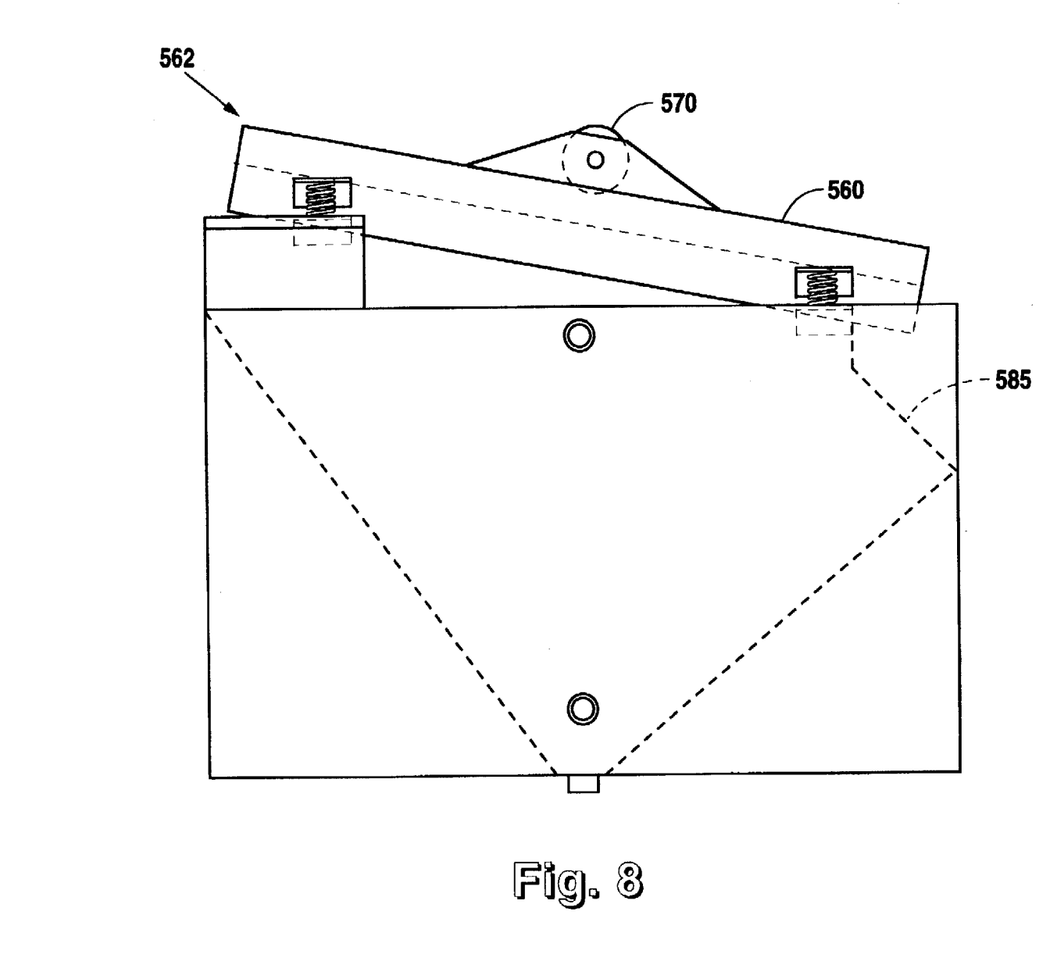
FIG. 8 is a side view of the screen and collector shown in partial cut-away.
Figure 9:
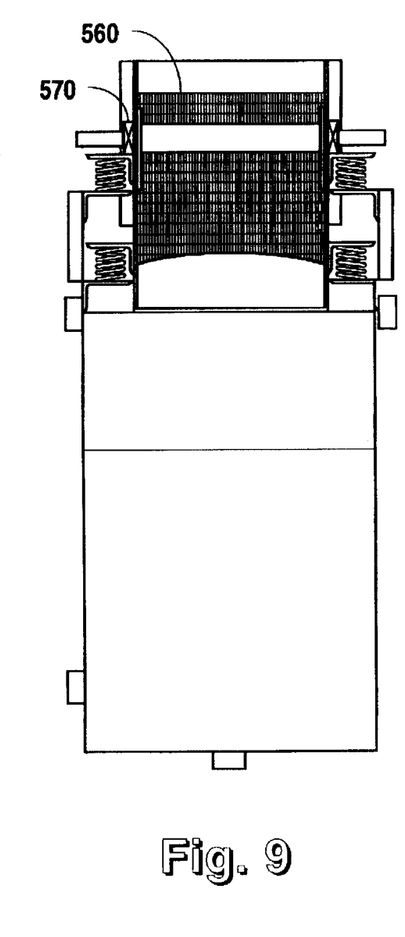
FIG. 9 is an end view of the screen and treating fluid collector.
Figure 10:
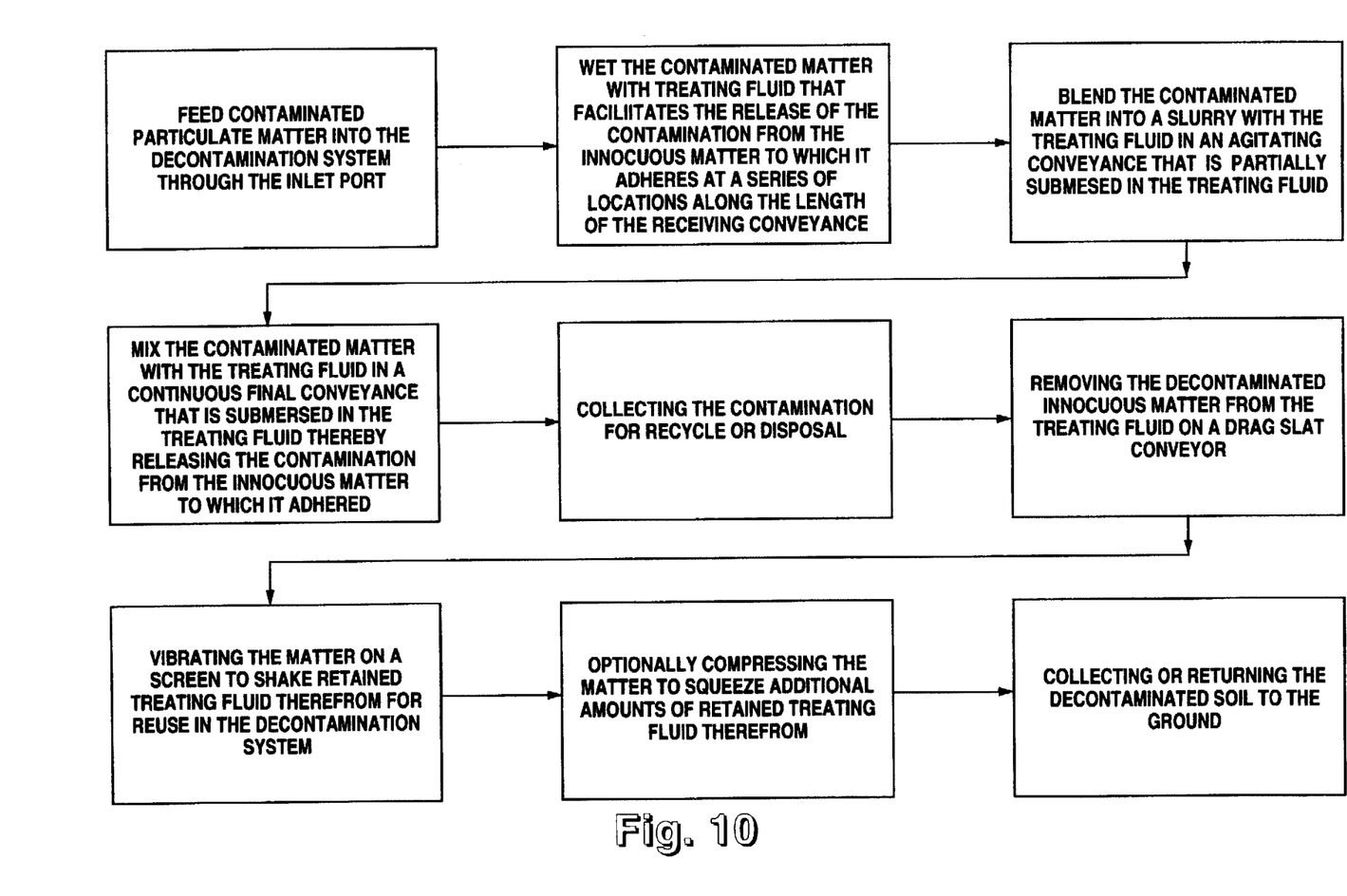
FIG. 10 is a schematic diagram of the steps used in an embodiment of the decontamination system.

Referring to FIG. 8, the soil is dropped from the discharge end 524 of the continuous conveyer 520 onto the upper end 562 of a vibrating inclined screen 560. The vibrating inclined screen 560 is inclined to cause the soil to flow downward during the shaking process. The screen 560 is vibrated by a shaker 570 that causes excess treating fluid 496 to be separated from the soil while the rotary motion of the shaker moves the soil down the screen 560. The size of screens used may range from 60 to 100 mesh, but other sizes may be justified depending on the type of soil being cleaned. Located below the vibrating inclined screen 560 is the collector 585 that funnels recovered treating fluid 496 into the treating fluid recovery system 580. The soil, after being shaken on the screen may be either collected and discharged or processed through a filter press 600 to remove additional solution.

As shown by FIG. 2, the filtrate is pumped by a recycle pump 582 to a cyclone separator 590. The cyclone separator 590 cleans the filtrate by removing fines such as silt from the solution at an efficiency rate of one hundred percent for fines that are 74 microns or greater. The separated fines are collected and disposed. The cleaned solution is recycled into the treating fluid reservoir 130.

After the decontamination process is completed and the system is purged of collected hydrocarbon, the remaining treating fluid 496 must be disposed. While not toxic, the fluid 496 may have a high pH and may require neutralization before being disposed in an approved waste water treatment facility or disposal well.

Figure 11:
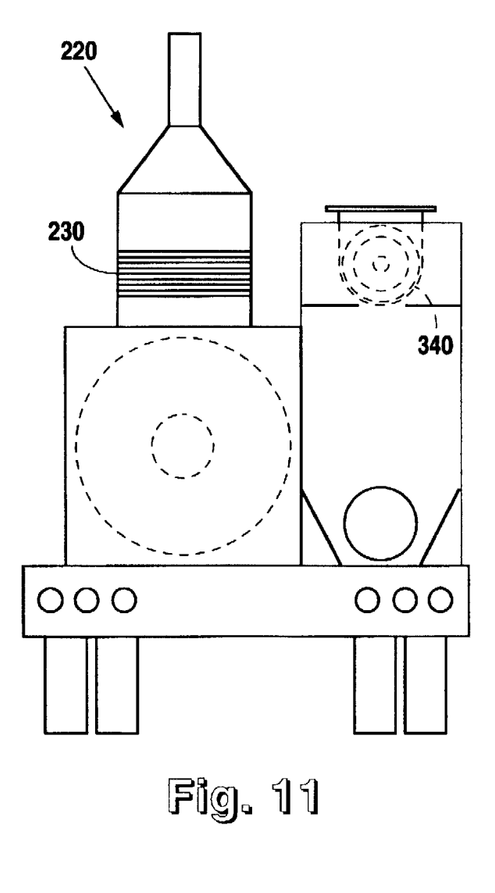
FIG. 11 is a back view of the decontamination system on a trailer.

The system 01 also includes a power unit 630 for operating items such as the shaker 570 and conveyances 40, 280, and 380. To provide mobility to the system 01, all the individual pieces are either bolted, welded or otherwise coupled directly or indirectly onto a towable trailer chassis 640. In the illustrated embodiment, the trailer is a standard drop deck trailer. In this manner, the system 01 can be easily transported to the site at which soil is to be treated.

A manway 480 is positioned on the outer wall of the treatment chamber 21 so that maintenance personnel may have access to the chamber 21 for cleaning and maintenance purposes. Furthermore, all pieces of the unit, except the packed section 230, are constructed from carbon steel. Corrosion is not a problem for equipment in contact with the modified sodium silicate solution because the solution acts as a corrosion inhibitor. The packed section 230 is constructed from stainless steel interlocked saddles because the packed section 230 is in contact with the modified sodium silicate only intermittently, therefore some corrosion may occur.

What is claimed and desired to be secured by Letters Patent is as follows:

1. A decontamination system for particulate matter, said system comprising:

a fluid treatment chamber, said fluid treatment chamber comprising:

a inlet port through which contaminated particulate matter is deposited into said fluid treatment chamber;

a continuous receiving conveyance for receiving deposited contaminated particulate matter and for transporting the particulate matter at least partially through said fluid treatment chamber;

a fluid applicator for wetting the contaminated particulate matter being carried by said receiving conveyance with a treating fluid that facilitates the separation of contamination from particulate matter;

an agitating conveyance into which wetted contaminated particulate matter is deposited from said continuous receiving conveyance, said agitating conveyance being at least partially submersed in treating fluid so that a slurry is formed from the combination of contaminated particulate matter and treating fluid;

a continuous final conveyance located in a lower portion of said fluid treatment chamber, said final conveyance being completely submersed in the treating fluid;

an exit port through which decontaminated particulate matter passes for removal from the treating fluid; and a fluid heater system for heat in a treating fluid supplied to said fluid treatment chamber said heater system comprising a direct fluid heater in which treating fluid is exposed directly to heated and an indirect fluid heater said indirect fluid heater having a inner chamber containing heated gas and an outer chamber through which treating fluid is circulated and heated indirectly by the heated gas.

2. The decontamination system for particulate matter as recited in claim 1 further comprising:

a treating fluid reservoir; and a heating conduit connected between said direct fluid heater and said indirect fluid heater that extends through an interior of said treating fluid reservoir so that heated gas passing through said heating conduit indirectly heats treating fluid contained within said reservoir.

3. The decontamination system for particulate matter as recited in claim 2, further comprising:

a treating fluid circulation system having a circulation pump for circulating treating fluid between said treating fluid reservoir, said direct fluid heater, and said indirect fluid heater.

4. The decontamination system for particulate matter as recited in claim 3, wherein said treating fluid circulation system directs treating fluid to said direct fluid heater when the treating fluid's temperature is less than about 170 degrees fahrenheit and restricts the flow of fluid to said direct heater when the treating fluid's temperature exceeds about 170 degrees fahrenheit thereby preventing vaporization of said treating fluid.

5. The decontamination system for particulate matter as recited in claim 4, wherein said treating fluid is a solution comprising water and a surfactant that promotes the release of hydrocarbon contaminants from soil.

6. The decontamination system for particulate matter as recited in claim 5, wherein said surfactant is modified sodium silicate.

7. The decontamination system for particulate matter as recited in claim 5, further comprising a hydrocarbon recovery system including a weir located above a hydrocarbon/treating fluid interphase in said fluid treatment chamber so that lighter hydrocarbons floating above the water pass over said weir and into a hydrocarbon collection chamber.

8. The decontamination system for particulate matter as recited in claim 2, wherein said fluid applicator further comprises:

a plurality of spray nozzles located along a length of said receiving conveyance;

a treating fluid supply conduit coupled in fluid communication between said treating fluid reservoir and said spray nozzles; and a treating fluid supply pump coupled to said treating fluid supply conduit and in fluid communication therewith for pumping treating fluid from the reservoir to said receiving conveyance for application to contaminated particulate matter.

9. The decontamination system for particulate matter as recited in claim 1, further comprising:

a continuous conveyor having an uptake end located proximate to a discharge end of said continuous final conveyance so that decontaminated particulate matter discharged from said discharge end of said final conveyance is deposited on said uptake end and removed from the treating fluid.

10. The decontamination system for particulate matter as recited in claim 9, further comprising:

a vibrating inclined screen having an upper end located proximate to a discharge end of said continuous conveyor so that decontaminated particulate matter discharged from said discharge end of said continuous conveyor at said upper end is sufficiently shaken so that excess treating fluid is recovered therefrom for return to a treating fluid reservoir.

11. The decontamination system for particulate matter as recited in claim 10, further comprising:

a filter press downstream of said vibrating screen for compressing retained treating fluid from said decontaminated particulate matter.

12. The decontamination system for particulate matter as recited in claim 10, further comprising:

a treating fluid recovery system, said recovery system comprising:

a collector positioned proximate to said vibrating inclined screen for collecting treating fluid released by said decontaminated particulate matter while on said screen; and a recovery pump coupled in fluid communication between said collector and said treating fluid reservoir for returning collected treating fluid to said reservoir.

13. The decontamination system for particulate matter as recited in claim 12, further comprising:

a cyclone separator coupled in fluid communication between said collector and said treating fluid reservoir for removing decontaminated particulate matter suspended in said recovered treating fluid before said fluid's return to said reservoir.

14. The decontamination system for particulate matter as recited in claim 1, wherein said receiving conveyance has a maximum capacity equal to a maximum processing capacity of said decontamination system thereby preventing said decontamination system from being overloaded.

15. The decontamination system for particulate matter as recited in claim 1, further comprising a towable trailer chassis, said decontamination system being coupled to said trailer chassis for transport thereupon.

16. A decontamination system for particulate matter, said system comprising:

a fluid treatment chamber, said fluid treatment chamber comprising:

a continuous receiving conveyance for receiving deposited contaminated particulate matter and for transporting particulate matter at least partially through said fluid treatment chamber;

at least a portion of said receiving conveyance being a wetting conveyance having a fluid applicator for wetting contaminated particulate matter being carried by said receiving conveyance with a heated treating fluid that facilitates the separation of contamination from particulate matter, the application of treating fluid being regulated so that contaminated particulate matter is wetted and not submerged in treating fluid;

a treating fluid heater for heating treating fluid before application to contaminated particulate matter to potentiate the treating fluid's cleansing capabilities;

an agitating conveyance into which wetted contaminated particulate matter is deposited from said continuous receiving conveyance, said agitating conveyance being at least partially submersed in heated treating fluid and operating sufficiently slowly to gently mix contaminated particulate matter in the treating fluid and minimize the particulate matter's suspension in the treating fluid;

a continuous final conveyance having an inlet located in a lower portion of said fluid treatment chamber for conveying cleansed particulate matter out of said fluid treatment chamber; and a dewaterer for draining treating fluid from cleansed particulate matter removed from said fluid treatment chamber.

17. The decontamination system for particulate matter as recited in claim 16, said system further comprising:

said treating fluid heater having a capacity for maintaining treating fluid above 150 degrees Fahrenheit.

18. The decontamination system for particulate matter as recited in claim 16, said system further comprising:

a skimmer for removing contamination floated to the top of said treating fluid within said treatment chamber.

19. The decontamination system for particulate matter as recited in claim 16, said treating fluid heater further comprising:

a direct fluid heater in which treating fluid is exposed directly to heated gas.

20. The decontamination system for particulate matter as recited in claim 19, said treating fluid heater further comprising:

an indirect fluid heater, said indirect fluid heater having a inner chamber containing heated gas and an outer chamber through which treating fluid is circulated and heated indirectly by the heated gas.

* * * * *